US008363664B2

(12) United States Patent
Ramankutty et al.

(10) Patent No.: US 8,363,664 B2
(45) Date of Patent: Jan. 29, 2013

(54) COMBINED GATEWAY FOR NETWORK COMMUNICATIONS

(75) Inventors: Rajesh Ramankutty, Nashua, NH (US); Rajesh Velandy, Nashua, NH (US); Sanil Kumar Puthiyandyil, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 401 days.

(21) Appl. No.: 12/543,298

(22) Filed: Aug. 18, 2009

(65) Prior Publication Data
US 2010/0039993 A1 Feb. 18, 2010

Related U.S. Application Data

(60) Provisional application No. 61/089,639, filed on Aug. 18, 2008.

(51) Int. Cl.
*H04W 4/00* (2009.01)
*H04L 12/28* (2006.01)
*H04L 12/56* (2006.01)
*H04L 12/64* (2006.01)

(52) U.S. Cl. ........................................ 370/401; 370/328
(58) Field of Classification Search .................. 370/401, 370/328
See application file for complete search history.

(56) References Cited

U.S. PATENT DOCUMENTS

| 8,064,909 | B2* | 11/2011 | Spinelli et al. ................ 455/436 |
| 2006/0265504 | A1 | 11/2006 | Taaghol et al. |
| 2007/0025370 | A1 | 2/2007 | Ghasem et al. |
| 2007/0165655 | A1* | 7/2007 | Haumont ........................ 370/401 |
| 2007/0254661 | A1 | 11/2007 | Chowdhury et al. |
| 2008/0304441 | A1* | 12/2008 | Tsirtsis et al. ................ 370/328 |
| 2009/0046655 | A1* | 2/2009 | Zhao et al. .................... 370/331 |
| 2009/0176513 | A1* | 7/2009 | Bosch et al. .................. 455/458 |
| 2009/0209255 | A1* | 8/2009 | Lassers et al. ................ 455/436 |
| 2010/0027448 | A1* | 2/2010 | Puthiyandyil et al. ........ 370/310 |
| 2010/0035578 | A1* | 2/2010 | Ahmed .......................... 455/411 |
| 2010/0037085 | A1* | 2/2010 | Qiang ............................... 714/2 |

FOREIGN PATENT DOCUMENTS
WO WO-2008/084392 7/2008

OTHER PUBLICATIONS

International Search Report and Written Opinion for corresponding International Patent Application No. PCT/US2009/054199 mailed Oct. 6, 2009.

* cited by examiner

*Primary Examiner* — Chi Pham
*Assistant Examiner* — Ahmed Elallam
(74) *Attorney, Agent, or Firm* — Wilmer Cutler Pickering Hale and Dorr LLP

(57) ABSTRACT

The functionalities of one or more of a mobility management entity (MME), serving gateway (SGW), and packet data network gateway (PGW) can be provided in a single device on the network. In the access gateway different functional elements are implemented as services and they can be configured on the same device. For example, the SGW and PGW can be configured on the same device. When user equipment UE connects from a home network, it is possible for the MME to choose the same SGW and PGW. This combined SGW and PGW can implement a single session for the UE, thereby capable of providing a savings in resources, allowing additional capacity, and allowing reduced latency and increased throughput because fewer hops are made on the network. This session acts as a SGW on the ingress side and a PGW on the egress side of the access gateway.

20 Claims, 7 Drawing Sheets

COMBINED GATEWAY FOR NETWORK COMMUNICATIONS

CROSS-REFERENCE TO RELATED APPLICATION

This application claims priority under 35 U.S.C. Section 119(e) to provisional Application Ser. No. 61/089,639, filed Aug. 18, 2008, which is incorporated herein by reference.

TECHNICAL FIELD

Systems and methods for providing a combined gateway in telecommunication networks are disclosed.

BACKGROUND

Wireless networks are networks that can use both wires and radio waves to carry information from one node in the network to one or more receiving nodes in the network. Cellular telephony is characterized by the use of radio cells that provide radio coverage for a set geographic area, with multiple cells arranged to provide contiguous radio coverage.

The first generation (1G) of wireless telephone technology were analog mobile phones. As technology progressed, a second generation (2G) of wireless service was introduced. The main difference between 1G systems and 2G systems was that radio signals being modulated in 2G were digital. Second generation technologies were primarily based into time division multiplexed access (TDMA) and code division multiplexed access (CDMA). Networks that were upgraded to handle higher-speed data transfer are referred to as 2.5G and 3G networks. The $3^{rd}$ Generation Partnership Project (3GPP) and the $3^{rd}$ Generation Partnership Project 2 (3GPP2) respectively developed GSM/UMTS and cdmaOne/CDMA2000 technologies. The next evolution is 4G technology, which is based on long term evolution-system architecture evolution (LTE-SAE).

Wireless communication systems and networks are used in connection with many applications, including, for example, satellite communications systems, portable digital assistants (PDAs), laptop computers, and mobile nodes (e.g., cellular telephones). One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile node. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized." That is, the data is divided into separate segments of information, and each segment receives "header" information that may provide, for example, source information, destination information, information regarding the number of bits in the packet, priority information, and security information. The packets are then routed to a destination independently, based on the header information. The data flow may include a number of packets or a single packet.

SUMMARY

The functionalities of one or more of a mobility management entity (MME), serving gateway (SGW), and packet data network gateway (PGW) can be provided in a single device on the network. This device can be an access gateway that is implemented on a Starent Networks, Corp. ST16 or ST40 multimedia core platform. In the access gateway different functional elements are implemented as services and they can be configured on the same device. For example, the SGW and PGW can be configured on the same device.

When user equipment UE (mobile node) connects from a home network, it is possible for the MME to choose the same SGW and PGW (the same access gateway). This combined SGW and PGW can implement a single session for the UE, thereby capable of providing a savings in resources, allowing additional capacity, and allowing reduced latency and increased throughput because fewer hops are made on the network. This session acts as a SGW on the ingress side and a PGW on the egress side of the access gateway.

When a UE roams to a different base station in the same or a different network, the MME may choose another SGW to be the serving gateway for the session. The PDN gateway remains on the same access gateway, acting as SGW and PGW. The UE session in the SGW and PGW transitions to a PGW-only session and the session exposes an S5/S8 interface to the SGW.

Other features and advantages will become apparent from the following detailed description, drawings, and claims.

DETAILED DESCRIPTION OF THE DISCLOSURE

Systems and methods are disclosed that provide a combined gateway for network communications in accordance with certain embodiments. The long term evolution-system architecture evolution (LTE-SAE) evolved packet core (EPC) standards includes a mobility management entity (MME), a serving gateway (SGW), and a packet data network (PDN) gateway (PGW) as separate network elements. A combined gateway allows the MME, the SGW, and PGW to function in a single network device (e.g., an access gateway). For the user equipment, this combined gateway provides a single session that can allow a savings in resources allowing for increased capacity, reduced latency, and increased throughput.

Figure 1:
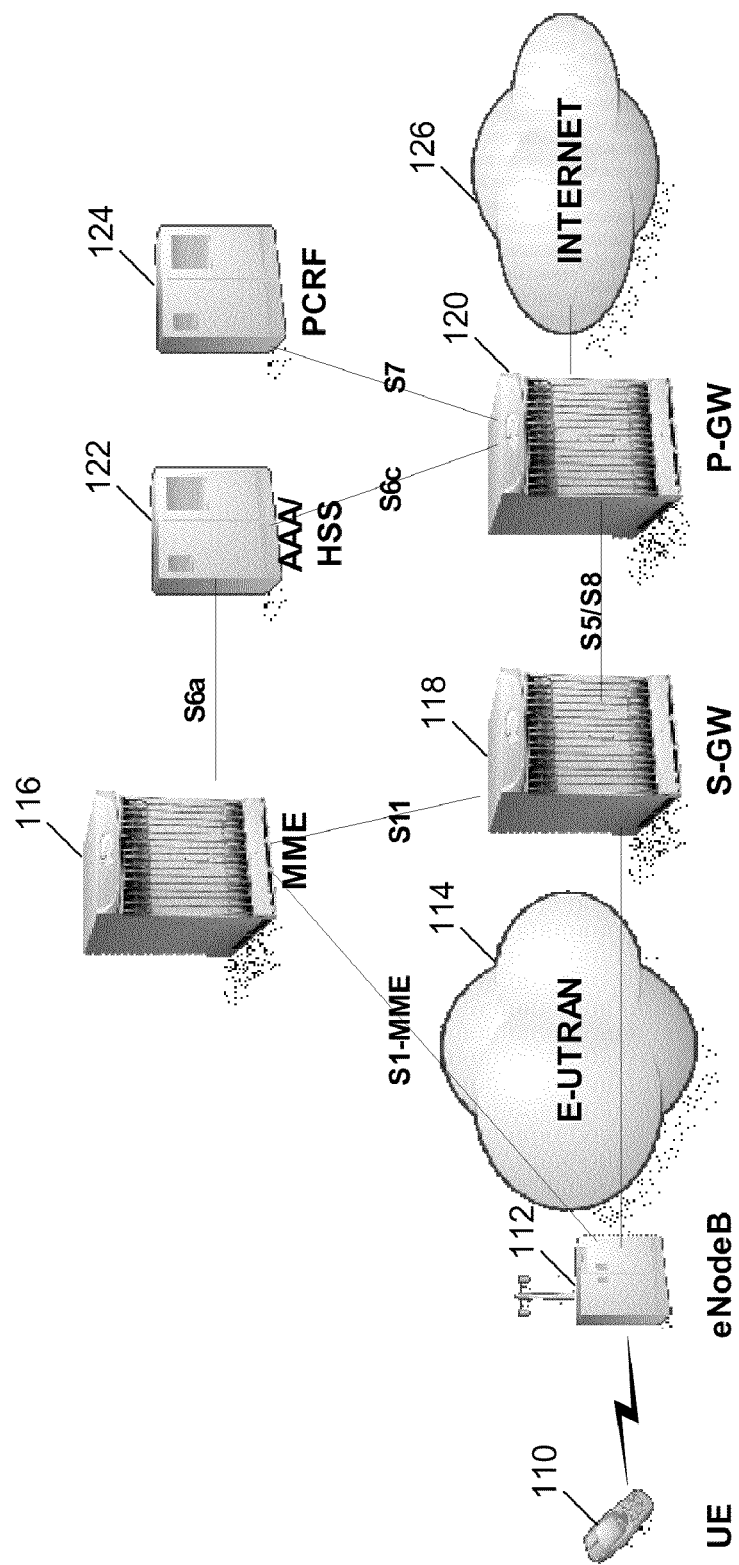
FIG. 1 illustrates a network configuration where different nodes are implemented as separate network devices in accordance with some embodiments.

FIG. 1 illustrates a generally known network configuration where evolved packet core nodes are implemented as separate network devices. The network configuration includes user equipment (UE) 110, eNodeB 112, evolved UMTS terrestrial radio access network (E-UTRAN) 114, mobility management entity (MME) 116, serving gateway (S-GW) 118, packet data network gateway (P-GW) 120, authentication, authorization, and accounting (AAA) server/home subscriber server (HSS) 122, policy and charging rules function (PCRF) 124, and internet 126. The UE 110 can be a cell phone, a personal digital assistant (PDA), a wireless laptop, or any other type of wirelessly enabled device. The AAA/HSS 122 is a subscriber database that supports the network entities that handle calls and data sessions. The AAA/HSS 122 stores subscription-related information (user profiles), performs authentication and authorization of the user, and can provide information about the user's physical location.

The MME 116 is a control-node for the LTE-SAE network. MME 116 is responsible for tracking and paging an idle mode UE 110 including retransmissions. The bearer activation/de-activation process and assignment of the S-GW for a UE 110 at the initial attachment and at the time of a handover is handled by the MME 116. The MME 116 can also authenticate the user by interacting with the AAA/HSS 122. The MME 116 is the termination point in the network for ciphering/integrity protection for Non-Access Stratum (NAS) signaling and can handle security key management. The MME also provides a control plane function for mobility between LTE-SAE and 2G/3G access networks with an S3 interface terminating at the MME 116 from a serving GPRS support node SGSN (not shown). The MME 116 also terminates the S6a interface towards the home HSS 122 for roaming UEs 110.

The SGW 118 routes and forwards user data packets, while also acting as the mobility anchor for the user plane during inter-eNodeB handovers and as the anchor for mobility for inter-technology handoffs. The SGW 118 can accomplish this by terminating an S4 interface and relaying traffic between 2G/3G systems and PGW 120. For idle state UEs 110, the SGW 118 terminates the downlink data path and triggers paging when down link data arrives for the UE. The SGW 118 can also manage and store parameters of the IP bearer service and network internal routing information.

The PGW 120 provides connectivity to the UE 110 to external packet data networks (e.g., internet 126) by being the point of exit and entry of traffic for the UE 110. A UE 110 may have simultaneous connectivity with more than one PGW 120 for accessing multiple packet data networks (PDN). The PGW 120 performs policy enforcement, packet filtering for each user, charging support, lawful interception and packet screening. Another key role of the PGW 120 is to act as the anchor for mobility between 3GPP and non-3GPP technologies such as WiMAX and 3GPP2 (CDMA 1x and EV-DO).

Figure 2:
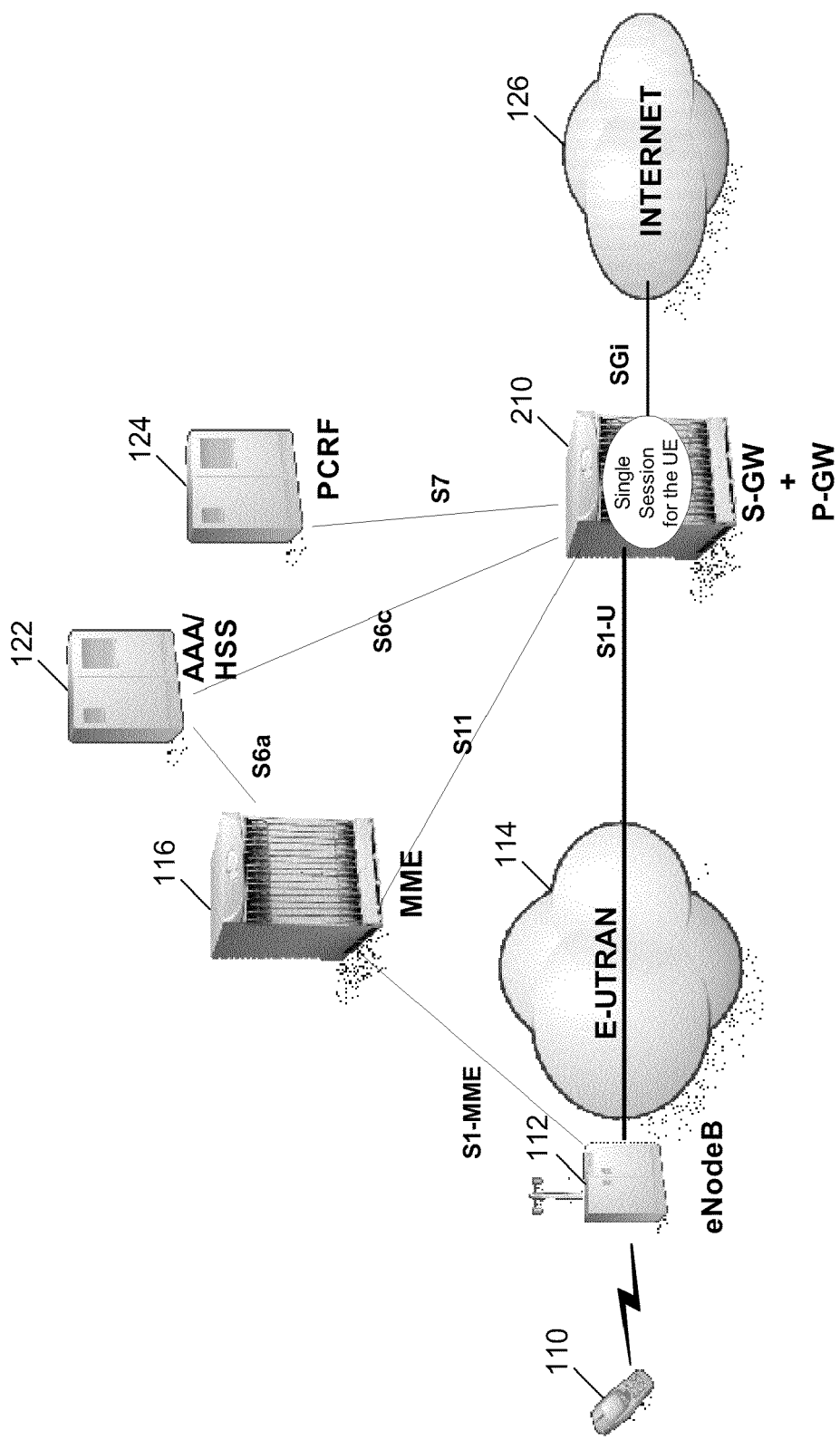
FIG. 2 illustrates a network configuration where a combined gateway is implemented in accordance with certain embodiments.

Referring to FIG. 2, the functionalities of one or more of the MME 116, SGW 118, and PGW 120 can be provided in a single device on the network. This device can be an access gateway that is implemented on a Starent Networks, Corp. ST16 or ST40 multimedia core platform. In the access gateway different functional elements are implemented as services and they can be configured on the same device. For example, the SGW and PGW can be configured on the same device.

The network configuration includes user equipment (UE) 110, eNodeB 112, evolved UMTS terrestrial radio access network (E-UTRAN) 114, mobility management entity (MME) 116, serving gateway (S-GW), packet data network (PDN) gateway (P-GW) 210, authentication, authorization, and accounting (AAA) server/home subscriber server (HSS) 122, policy and charging rules function (PCRF) 124, and internet 126. When UE 110 connects from the home network, it is possible for the MME 116 to choose the same SGW and PGW 210 (the same access gateway). This combined SGW and PGW 210 can implement a single session for UE 110, thereby capable of providing a savings in resources, allowing additional capacity, and allowing reduced latency and increased throughput because fewer hops are made on the network. This session acts as a SGW on the ingress side and a PGW on the egress side of the access gateway. The session can have interfaces to the AAA/HSS 122 (S6c interface) and PCRF 124 (S7 interface). As indicated in FIG. 2, there is no S5/S8 interface between the SGW and PGW with the single session.

Figure 4:
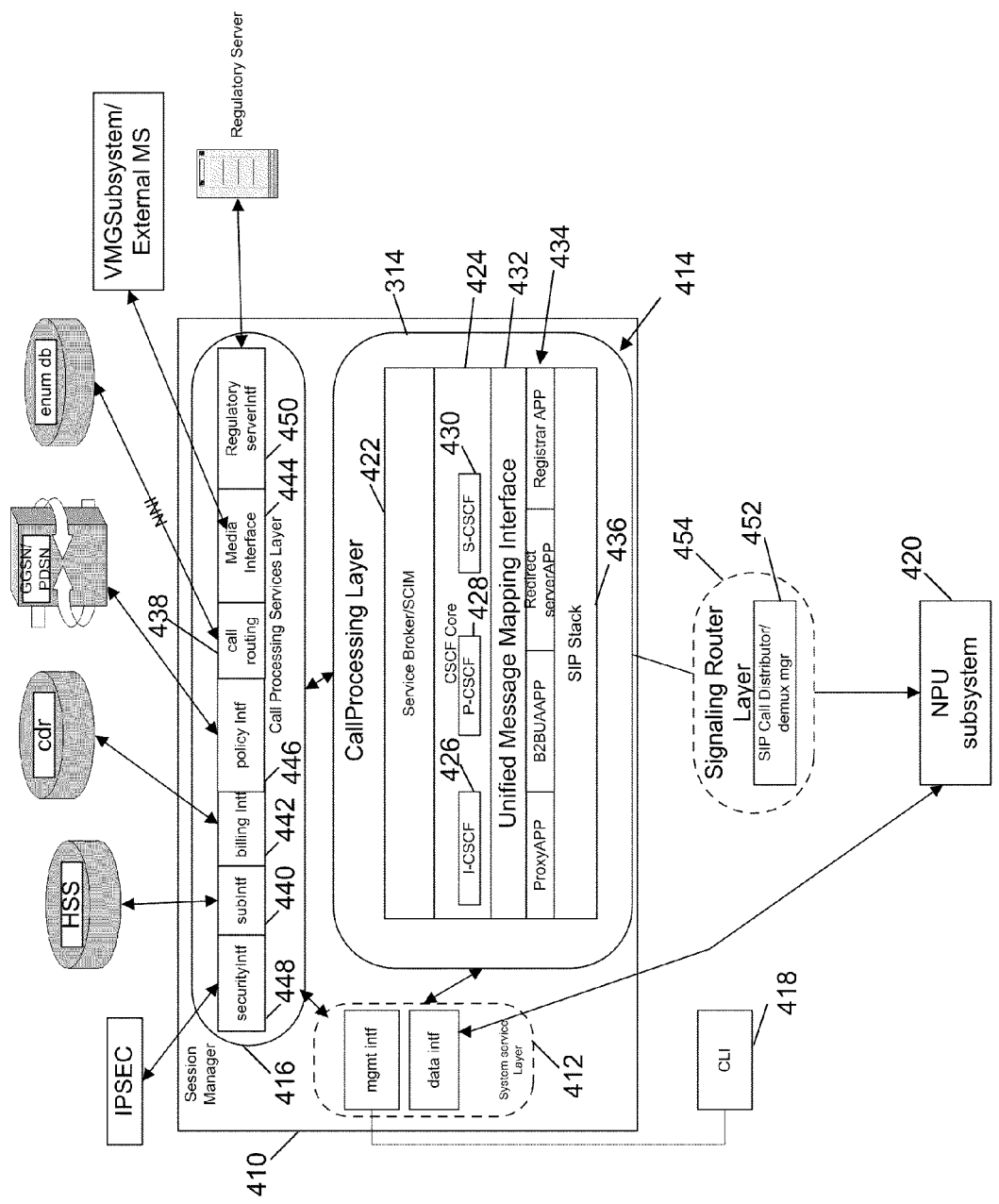
FIG. 4 illustrates a control plane architecture that can be used to implement a combined gateway in an access gateway in accordance with certain embodiments.

Thus, while it has been generally known that multiple gateways and other components can be co-located in a single housing (e.g., see patent publication no. 2007/0254661 to Chowdhury et al.), and also that 3GPP standards TS 23.401 refers to a single gateway configuration option in conjunction with FIG. 4.2.1-2, such references do no indicate a single session with the potential savings in resources, capacity, throughput, and latency.

Figure 3:
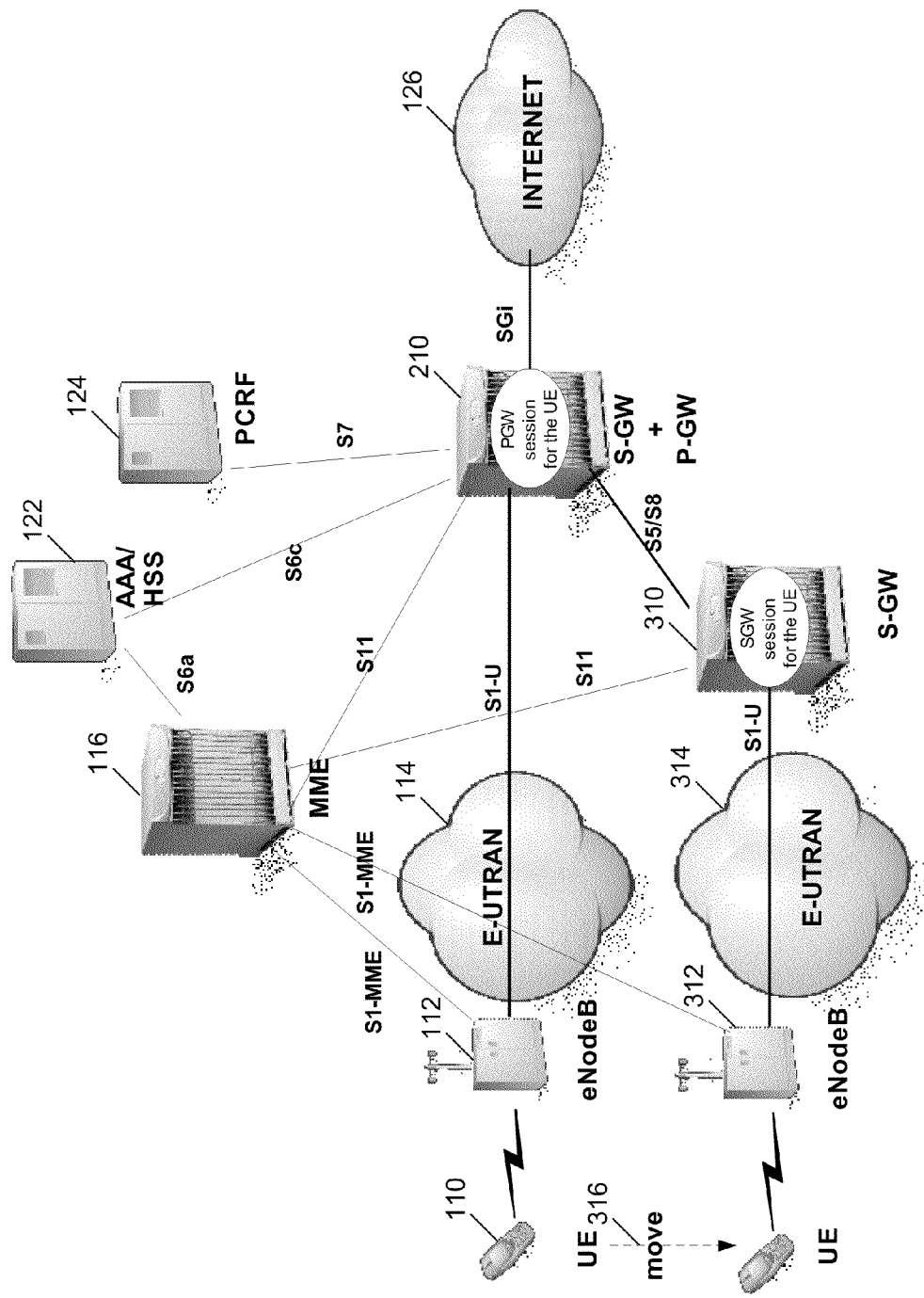
FIG. 3 illustrates a network configuration where a handoff of user equipment occurs in accordance with certain embodiments.

FIG. 3 illustrates an embodiment of a network configuration where a handoff of user equipment occurs. The network configuration includes user equipment 110, eNodeB 112, eNodeB 312, E-UTRAN 114, and E-UTRAN 314, mobility management entity (MME) 116, serving gateway (S-GW) and packet data network gateway (P-GW) 210, serving gateway (S-GW) 310, authentication, authorization, and accounting (AAA) server/home subscriber server (HSS) 122, policy and charging rules function (PCRF) 124, and internet 126. When UE 110 roams (shown with arrow 316) to a different eNodeB 312 in the same or a different network, MME 116 may choose another SGW 310 to be the serving gateway for the session. The MME 116 might make this choice for many reasons, including proximity to eNodeB 312. The PDN gateway remains on the same access gateway 210 (acting as SGW and PGW). The UE session in the SGW and PGW 210 transitions to a PGW-only session and the session exposes an S5/S8 interface to SGW 310. Thus, while the single session implementation of FIG. 2 would not utilize an S5/S8 interface, the gateways would still be able to implement these interfaces as needed for a handover situation as shown in FIG. 3.

FIG. 4 illustrates an exemplary control plane architecture that can be used to implement a combined gateway in an access gateway. A session manager 410 services and processes user session data flow for user equipment (UE). Session manager 410 includes functional layers such as a system service layer 412, a call processing layer 414, and a call processing support services layer 416. The system services layer 412 provides an interface for instructions to be passed to the session manager and the other layers. A command line interface (CLI) 418 can be provided. Network processing unit (NPU) subsystem 420 can be used to provide packet flows and for other processing.

The call processing layer 414 includes a service broker/Service Control Interaction Manager (SCIM) 422, a call session control function (CSCF) core 424 that includes an interrogating CSCF (I-CSCF) 426, proxy CSCF (P-CSCF) 428, and serving CSCF (S-CSCF) 430, a unified message mapping interface 432, applications 434, and a SIP stack 436. In some embodiments, the CSCF core includes one of the CSCF functionalities, for example, the P-CSCF. The call processing support services layer 416 includes a variety of services such as routing and address translation service 438, subscriber management service 440, changing interface service 442, media interface service 444, quality of service (QoS) policy interface service 446, security interface 448, and regulatory server interface 450.

Looking at the call processing layer 414, this layer includes signaling protocols and call control using universal SIP as an application program interface (API). The signaling protocols can be SIP or other protocols, such as ISUP, MGCP, or H.323. Further, the call processing layer 414 allows interworking between SIP variants and other protocols through a unified mapping interface. The unified mapping interface can convert protocol specific messages and parameters to a universal SIP-like API format. SIP-like messaging is used, in some embodiments, because SIP has the largest message set and can cover the possible messaging scenarios for SIP and the other protocols. The call processing layer 414 can also provide transparency to data that need not be processed by the CSCF core by placing that information into an envelope. Parameters that are not of interest can be placed in an envelope and remain unmodified. The CSCF core allows any text string as the calling and called number, and the number does not need to be restricted to an E.164 number. The number could be, for example, an Address of Record (AoR) or any name string with a domain name.

A demux manager 452 resides in the signal routing layer 454, as shown in FIG. 4. The signal routing layer 454 with the demux manager can determine where a packet flow is sent for processing. The packet flow can be sent to a process instance for further processing and/or signal handling. The demux manager can be used to analyze packet flows or traffic entering into a gateway. This analyzing may encompass packet sniffing, extracting of information from packet headers, sorting extracted information, deep packet inspection, and processing of information obtained from one or more packets. Messages analyzed by a demux manager can contain information which can be extracted (or sniffed) such as an IP-address assigned to the mobile node, a network access identifier (NAI), an international mobile subscriber identity (IMSI), a mobile subscriber identification (MSID), a correlation-ID (for CDMA implementations), a user data record (UDR), event data records (EDR), a calling-station-ID, and/or any other applicable information.

Service control interaction manager (SCIM) 422 can be a functional layer for enforcement of policies relating to device features and interactions between devices. Legacy mobile nodes were previously designed with the network providing the services. Session initiation protocol (SIP) enabled mobile nodes and next generation mobile nodes are designed with capabilities to handle a number of call features rather than the network. These call features can include call forwarding, hold, transfer, caller ID screening, call waiting, and three-way calling. There are also features that are controlled by the network such as multi-endpoint interaction service (users with multiple phones can have a number ring in different places depending on a criteria), call forwarding when a user has a mobile node turned off, find me/follow me service, multiparty conference, and address book management.

SIP mobile nodes can complicate interaction with the network because some features are provided by the network and others are provided by the mobile node. There can also be problems with legacy mobile nodes communicating with SIP mobile nodes and using features that are to be provided by the SIP mobile nodes. Further mobile nodes can be spread across different access networks and may have totally different feature sets. For example, one phone might have video, voice, and text while another only voice and text. Further, mobile nodes from different generations (e.g., 2G, 2.5G, 3G) can have varying capabilities. Abstraction of the mobile node can ease burdens at the application server and allow for simpler programming of application servers. The SCIM can present the application server with one or more mobile nodes all having the same capabilities with the SCIM handling any modifications to fit the service to the particular mobile node's capabilities.

In providing services to mobile nodes, the SCIM interacts with a S-CSCF. The S-CSCF can obtain the user profile from a subscriber database (e.g., HSS) during registration. This profile can be cached in the session manager or CSCF core for the registration lifetime and updated as new information is received. The user profile can include information about the user as well as any services to which the user is subscribed. The list of services applicable to a user can be included in an initial filter criteria (IFC). The initial filter criteria can be a rule set that determines when to include an application server during call processing based on a variety of matching criteria. The matching criteria can be defined in one or more service point triggers (SPT). The SCIM can analyze and provide information on the next IFC to execute for a user, and update the current IFC by allowing a new set of triggers to be added as new applications are added to the network. The SCIM can also provide a proxy function or a generic infrastructure to execute and apply new triggers during feature interaction. In some embodiments, the SCIM executes IFCs based on static information. In other embodiments, the SCIM executes IFCs based on the dynamic network conditions such as bandwidth requirement and/or local/peer node congestion.

The IFC evaluation provided by the SCIM can occur as follows in some embodiments. IFC can include trigger points that identify when to start, stop, or modify a service or feature. The trigger points can include service point triggers. Service point triggers can include various conditions that are applied to messages determine if a match occurs. The IFC, trigger points, and service point triggers can be obtained from the subscriber database or from a local cache. The data obtained from the subscriber database can include the address of the application server to route a request if there is a match with a trigger condition. Service trigger data can include the following attributes priority, session case, SIP method, request URI, SIP header, and session description protocol (SDP). The priority can define the order of trigger evaluation. The session case can specify if the case is originating, terminating, or terminating unregistered.

The SCIM in fulfilling and processing IFCs can monitor application service availability and can provide load balancing. This can be achieved using a number of methods such as least loaded, round robin, or a calculation based on factors such as load on the processing unit(s), number of active sessions, number of suspended sessions, outstanding requests, and round trip time. In some embodiments, this information is provided in real time or nearly real time so that a determination can be made regarding availability. An application server may not be able to provide service to another session because the application server is experiencing service congestion (e.g., the required quality of service (QoS) is not available to run the service) even though the physical server is available (i.e., the server is not experiencing network congestion).

SCIM 422 can also manage interactions between the mobile node and legacy application servers, which can include non-IMS compliant SIP servers. In some embodiments, the SCIM hides the details of the mobile node and the device's features from application servers and forwards the features that the mobile node can accept. In certain embodiments, a CSCF can abstract user service capability from the SIP-AS in a SCIM layer. Once the various device characteristics are known, the CSCF can understand and mediate the various device characteristics and can give an illusion to the SIP-AS that all the service users have the same capabilities. This hiding removes the need for the SIP-AS to have to control how to interact with the mobile node. For example, for a PUSH to X service, while the SIP-AS will treat all the users as if they had voice/video and text capabilities, the CSCF can make sure that the users are offered right kind of media types. PSTN Access users could be offered just 64 kbps voice or H.324M muxed media. A text device would be offered only text, while a SIP video phone could be offered all 3 media types.

On the other side, if a mobile node requests a service, such as streaming video, voicemail, or music, the SCIM can direct the request to a legacy non-SIP enabled application server. The SCIM takes the response from the legacy application server and performs any necessary conversions and forwards it on to the mobile node. The SCIM, in some embodiments, promotes interoperability between mobile nodes and application servers. The SCIM can relieve application servers of the burden tracking mobile node capabilities, and can extend the lifespan of legacy equipment (legacy servers or pre-IMS/MMD servers) which can continue to be used because the SCIM is managing how and what content is served to the mobile node. Further, many times these legacy application servers use competing protocols such as H.324M muxed media, direct talk, and push-to-talk. The gateway can provide conversion of these competing protocols to extend services between devices that are otherwise incompatible. In some embodiments, service can be provided to an application server that does not support one or more of the SIP extension used for IMS end points to establish IMS session, for example, preconditions, update, and 100 Rel extensions. CSCF core provided interworking can be used to communicate between Internet and/or non IMS SIP application servers and clients. In some embodiments, SIP procedures are used that allow interworking towards the external client. This functionality can be provided as a back-to-back user agent (B2BUA). As a B2BUA, the CSCF core can consult the peering server's capability during the initial route lookup based on the SIP-AS information in the subscriber profile, which can be cached in some embodiments.

In some embodiments, a message can be sent to a mobile node to get the capabilities from the mobile node. This message can be an option message. From the information obtained from this message get the media resources. The SCIM can interact between the application servers. For example, the SCIM can send a message to a calendar application server and the calendar application server can report back the services the mobile node can receive during certain hours of the day. The SCIM can then route the call to another application server to handle the call. Additionally, this layer with a CSCF core interworking function can maintain a standard SIP interface into legacy service nodes like IVR/voice mail systems and the CSCF can proxy them and make them look like IMS SIP-ASs (proxy a ISC interface for legacy service nodes), in some embodiments.

Figure 5:
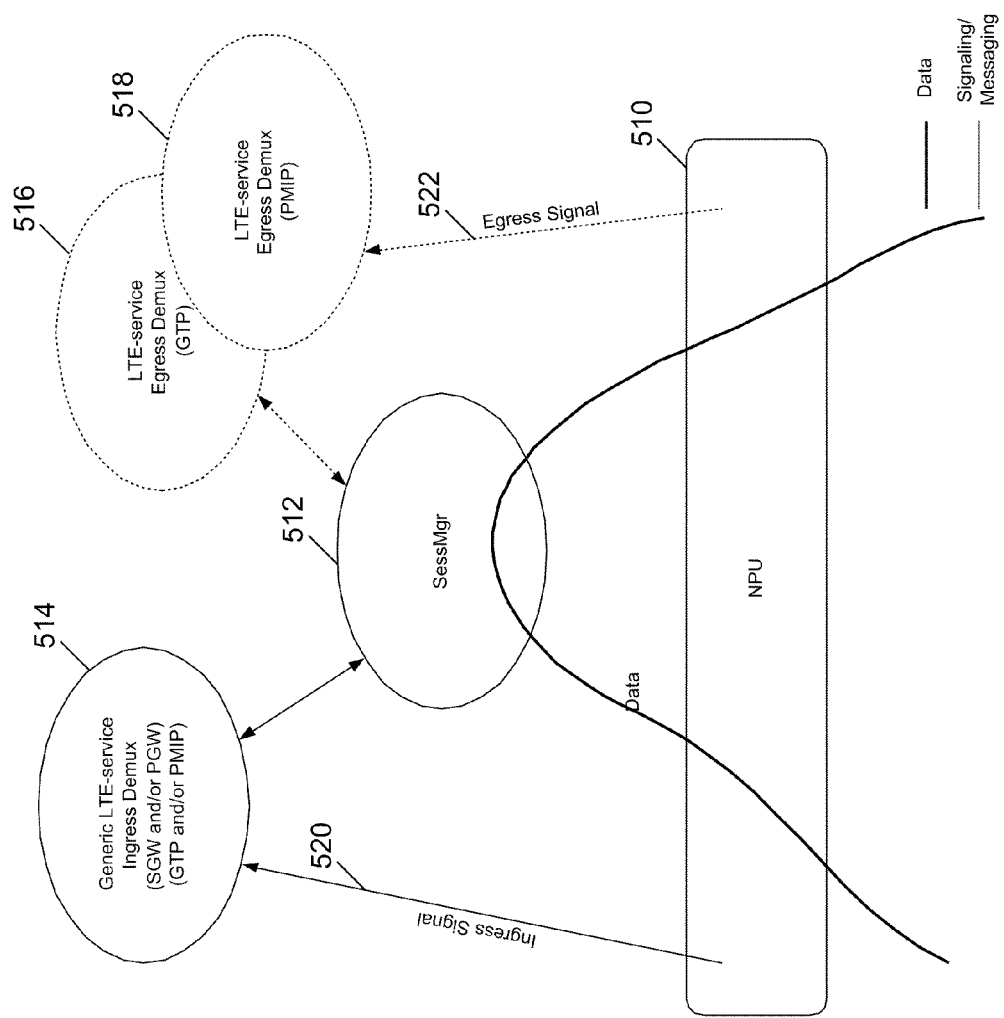
FIG. 5 illustrates a system architecture for the combined gateway in an access gateway in accordance with certain embodiments.

FIG. 5 illustrates a system architecture for the combined gateway in an access gateway in accordance with certain embodiments. The system architecture includes a network processing unit (NPU) 510, session manager 512, ingress demux 514, egress demux (GTP) 516, egress demux (PMIP) 518, ingress signal 520, and egress signal 522. Depending on the embodiment, ingress demux 514 acts as an ingress side signaling demultiplexer for a SGW and/or PGW simultaneously. The ingress demux 514 can support different variants of the S5/S8 interface such as GPRS tunneling protocol (GTP) bases or proxy mobile IP (PMIP) bases when acting as a PGW. The egress demuxes 516 and 518 are used when the access gateway is acting as a standalone SGW, although for a session either egress demux 516 or 518 may be used alone. The egress signaling demultiplexer assists in redirecting the egress side signaling to the session manager supporting the session for the UE. The control plane provides both combined and standalone service with the ability to transition from combined service to standalone service, by providing a new type of demux. This demux can provide signal demultiplexing for a standalone SGW, a standalone PGW, or an integrated SGW and PGW simultaneously to allow the access gateway to provide these service functionalities.

In some embodiments, user equipment connects on a SGW+PGW gateway and has a single session and then, because of SGW relocation, the session transitions to a PGW-only session. The session transitions from a SGW+PGW session to a PGW-only session to accommodate this relocation. As part of this, ingress demux 514 transitions from a SGW ingress signaling demultiplexer to a PGW ingress signaling demultiplexer.

Figure 6:
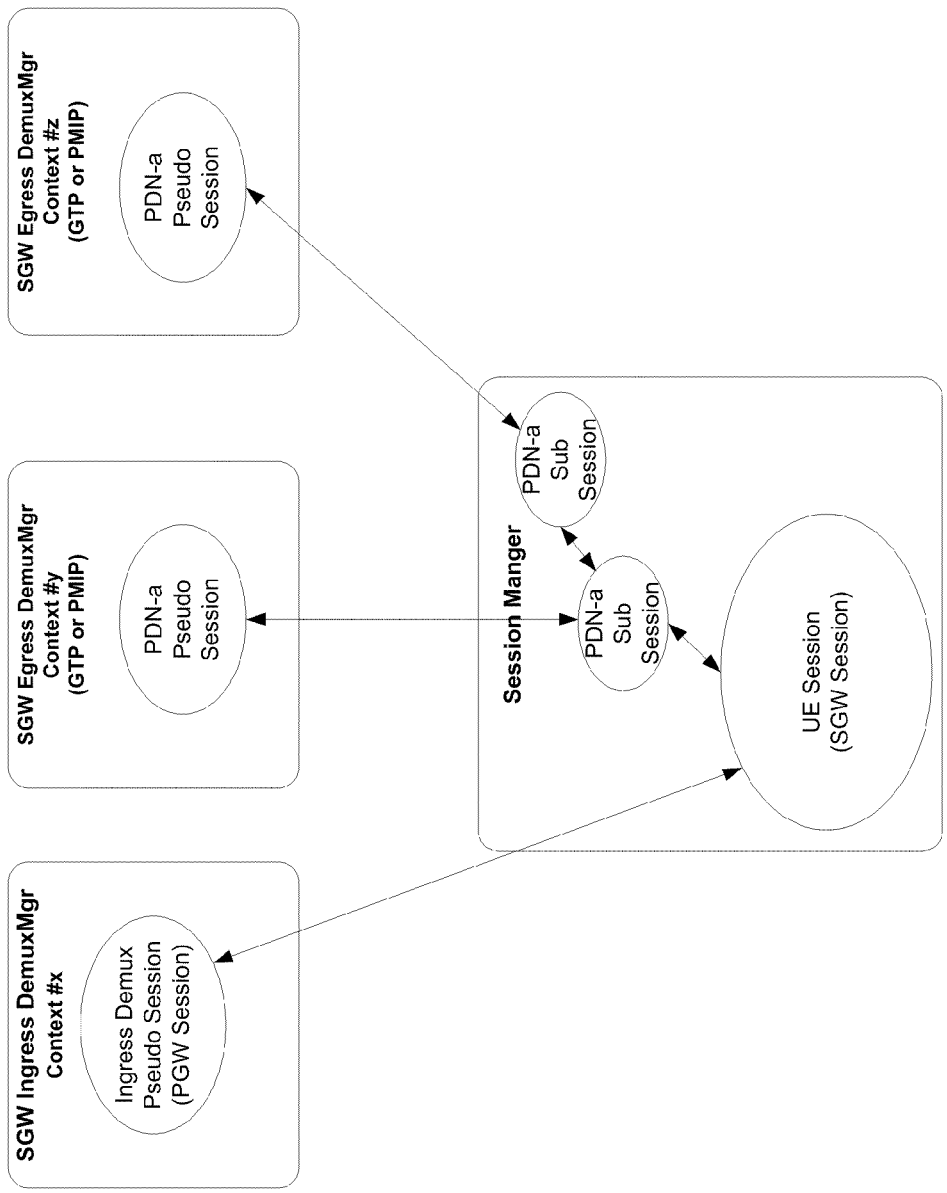
FIGS. 6 and 7 are block diagrams demonstrating implementations of the combined gateway.

Referring to FIG. 6, in the case when a chassis is configured with both the SGW and PGW services, when a session is connected on the SGW, it can determine that the PGW corresponding to the PDN requested is in the same chassis. In this case, it is possible to optimize the session by having a single session instead of one session in the SGW and another one in the PGW.

Figure 7:
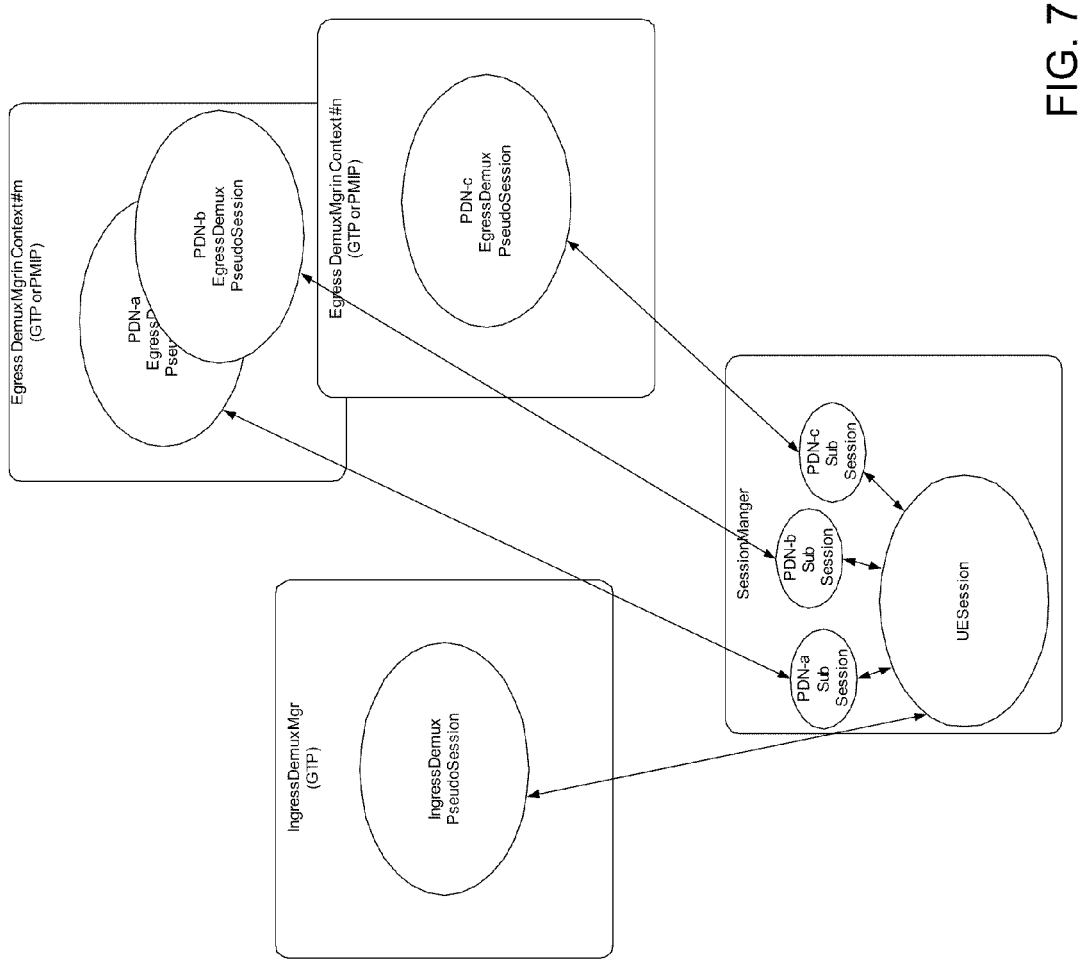

Referring to FIG. 7, the SGW (such as an HRDP Serving Gateway) can connect to multiple PDNs via different services (GTP and/or PMIP) and through different contexts. Inside the session manager, there is one UE session and multiple PDN sub-sessions. The PDN sub-session is a lighter weigh datastructure than the UE session. The ingress demux manager (GTP) would have individual pseudo-sessions corresponding to the ingress connection towards the base station (eNodeB). On the egress side, the egress demux manager (GTP and/or PMIP) would have individual pseudo-sessions corresponding to each of the PDNs to which the UE connects.

The use of different contexts is discussed generally in patent publication no. 2004/0250159, which is incorporated herein by reference. Ingress and egress contexts and demux managers are also discussed generally in patent publication no. 2007/0253328, which is incorporated herein by reference The access gateway can perform multiple and different integrated functionalities. In some embodiments, an access gateway, a packet data serving node (PDSN), a foreign agent (FA), or home agent (HA) can be implemented on a network device. Other types of functionalities can also be implemented on a network device in other embodiments are a Gateway General packet radio service Support Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A network device can include a PDSN, a FA, a HA, a GGSN, a PDIF, an ASNGW, a UPE, an IP Gateway, an access gateway, a HSGW, or any other applicable access interface device. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. In certain embodiments, a gateway device is provided by Starent Networks, Corp. of Tewksbury, Mass. on an ST16 or ST40 multimedia platform.

The gateway device can include slots for loading application cards and line cards. A midplane can be used in the gateway device to provide intra-gateway communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the gateway device implemented by establishing inter-card communications between application cards and line cards. The control bus interconnects the control and management processors within the gateway device. The gateway device management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The gateway device supports at least two types of application cards: a switch processor card and a packet accelerator card. The switch processor card serves as a controller of the gateway device and is responsible for such things as initializing the gateway device and loading software configurations onto other cards in the gateway device. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the gateway device provide input/output connectivity and can also provide redundancy connections as well.

In some embodiments, a ST40 embodiment of the gateway device can support a system management card (SMC) and a packet services card (PSC). The system management card is a system control and management card for managing and controlling other cards in the gateway device. The packet services card is a high-speed processing card that provides multi-threaded point-to-point, packet data processing, and context processing capabilities, among other things.

The operating system software can be based on a Linux software kernel and run specific applications in the gateway device such as monitoring tasks and providing protocol stacks. The software allows gateway resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, HSGW, or IPSG).

The gateway device's software can be divided into a series of tasks that perform specific functions. These tasks communicate with each other as needed to share control and data information throughout the gateway device. A task is a software process that performs a specific function related to system control or session processing. Three types of tasks operate within the gateway device in some embodiments: critical tasks, controller tasks, and manager tasks. The critical tasks control functions that relate to the gateway's ability to process calls such as gateway initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a gateway device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the gateway device by monitoring the various software and hardware components of the gateway device. Recovery control task subsystem is responsible for executing a recovery action for failures that occur in the gateway device and receives recovery actions from the high availability task subsystem. Shared configuration task subsystem provides the gateway device with an ability to set, retrieve, and receive notification of gateway configuration parameter changes and is responsible for storing configuration data for the applications running within the gateway device. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the gateway, which include creating separate VPN contexts, starting IP services within a VPN context, managing IP pools and subscriber IP addresses, and distributing the IP flow information within a VPN context. In some embodiments, within the gateway device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a gateway device can include any processing determined by the context. For example, packet processing may involve high-level data link control (HDLC) framing, header compression, and/or encryption. In certain embodiments, the software is stored on a computer readable medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

What is claimed is:

1. A system for a wireless packet data network in which mobile devices communicate with a packet data network for content through a radio access network, comprising:
   a combined gateway including:
      a processor and memory configured to:
         provide a serving gateway (SGW) functionality for communicating with a first set of one or more radio access networks; and
         provide a packet data network gateway (PGW) functionality for communicating with a packet data network; and
      session information, for a single session, is stored by the combined gateway, such that the single session information can be interacted with by both operations performed by the serving gateway functionality and operations performed by the packet data network functionality;
      the combined gateway configured to receive a packet from one of the first set of one or more radio access networks, internally process that packet using the serving gateway functionality and the packet data network gateway functionality in combination with the single session information, and transmit one or more corresponding packets to the packet data network, thereby providing reduced latency as compared to processing the packet with a separate serving gateway and packet data network gateway.

2. The system of claim 1, further including one or more interfaces to an authentication, authorization, and accounting server/home subscriber server and to a policy and charging rules function.

3. The system of claim 1, further including one or more interfaces to a mobility management entity.

4. The system of claim 1, wherein the combined gateway further comprises a mobility management entity that is combined with the SGW and PGW functionalities.

5. The system of claim 1, wherein the SGW and PGW functionalities are capable of implementing S5 and/or S8 interfaces, wherein the S5 and/or S8 interfaces are not utilized when the SGW and PGW functionalities are providing a single session information.

6. The system of claim 1 further comprising a second serving gateway for communicating with a second set of one or more radio access networks that are different from the first set of one or more radio access networks communicating with the combined gateway, wherein the system is responsive to a UE moving from the first set of radio access networks to the second set of radio access networks, for causing the UE to have a session with the serving gateway, the serving gateway communicating with the combined gateway via a S5 and/or S8 interface, such that the combined gateway implements a PGW session.

7. The system of claim 1, wherein the combined gateway can transition from a single combined SGW and PGW session to a PGW-only session.

8. The system of claim 7, wherein the combined gateway includes an ingress demux that transitions from a SGW ingress signaling demultiplexer to a PGW ingress signaling demultiplexer.

9. The system of claim 1, wherein the combined gateway includes a network processing unit (NPU) subsystem, a session manager, an ingress demultiplexer for receiving an ingress signal from the NPU subsystem and providing signals to the session manager, and an egress demultiplexer for receiving an egress signal from the NPU subsystem and providing signals to the session manager.

10. The system of claim 9, wherein the ingress demux supports one or both of GPRS tunneling protocol (GTP) and proxy mobile IP (PMIP).

11. The system of claim 9, wherein the egress demux supports one or both of GPRS tunneling protocol (GTP) and proxy mobile IP (PMIP).

12. The system of claim 1, wherein the single session information has multiple sub-session information corresponding to multiple packet data networks.

13. A method comprising:
   receiving at a combined gateway a packet from a radio access network, wherein the combined gateway provides both a serving gateway (SGW) functionality for communicating with the radio access network and a packet data network gateway (PGW) functionality for communicating with a packet data network;
   processing the packet using the serving gateway (SGW) functionality in combination with a single session information, for a single session, stored by the combined gateway, wherein the single session information can be interacted with by both operations performed by the serving gateway functionality and operations performed by the packet data network functionality;

processing the packet using the packet data network gateway (PGW) functionality in combination with the same single session information stored by the combined gateway; and transmitting one or more corresponding packets to the packet data network, thereby providing reduced latency as compared to processing the packet with a separate serving gateway and packet data network gateway.

14. The method of claim 13, wherein the SGW and PGW functionalities are capable of implementing S5 and/or S8 interfaces, wherein the S5 and/or S8 interfaces are not utilized when the SGW and PGW functionalities are providing a single session information.

15. The method of claim 13, further comprising transitioning the single session information to a session information that is used by the PGW functionality only.

16. The method of claim 13, wherein the single session information has multiple sub-session information corresponding to multiple packet data networks.

17. Software encoded on one or more non-transitory computer-readable media and when executed on a combined gateway operable for:

receiving at the combined gateway a packet from a radio access network, wherein the combined gateway provides both a serving gateway (SGW) functionality for communicating with the radio access network and a packet data network gateway (PGW) functionality for communicating with a packet data network;

processing the packet using the serving gateway (SGW) functionality in combination with a single session information stored by the combined gateway, wherein the single session information can be interacted with by both operations performed by the serving gateway functionality and operations performed by the packet data network functionality;

processing the packet using the packet data network gateway (PGW) functionality in combination with the same single session information, for a single session, stored by the combined gateway; and transmitting one or more corresponding packets to the packet data network, thereby providing reduced latency as compared to processing the packet with a separate serving gateway and packet data network gateway.

18. The software of claim 17, wherein the SGW and PGW functionalities are capable of implementing S5 and/or S8 interfaces, wherein the S5 and/or S8 interfaces are not utilized when the SGW and PGW functionalities are providing a single session.

19. The software of claim 17, further comprising software operable to transition the single session information to a session information that is used by the PGW functionality only.

20. The software of claim 17, wherein the single session information has multiple sub-session information corresponding to multiple packet data networks.

* * * * *